(12) United States Patent
Carreras et al.

(10) Patent No.: US 11,529,988 B2
(45) Date of Patent: Dec. 20, 2022

(54) PORTABLE STROLLER ROCKING DEVICE

(71) Applicants: Franck Carreras, Cannes (FR); Julie Carreras, Cannes (FR)

(72) Inventors: Franck Carreras, Cannes (FR); Julie Carreras, Cannes (FR)

( * ) Notice: Subject to any disclaimer, the term of this patent is extended or adjusted under 35 U.S.C. 154(b) by 398 days.

(21) Appl. No.: 15/733,128

(22) PCT Filed: Nov. 22, 2018

(86) PCT No.: PCT/FR2018/000253
§ 371 (c)(1),
(2) Date: May 22, 2020

(87) PCT Pub. No.: WO2019/102080
PCT Pub. Date: May 31, 2019

(65) Prior Publication Data
US 2020/0369311 A1 Nov. 26, 2020

(30) Foreign Application Priority Data

Nov. 22, 2017 (FR) ...................................... 1771247

(51) Int. Cl.
| | |
|---|---|
| *B62B 9/22* | (2006.01) |
| *A47D 13/10* | (2006.01) |
| *A47D 15/00* | (2006.01) |
| *G01D 21/02* | (2006.01) |
| *G01P 13/00* | (2006.01) |
| *H04W 4/80* | (2018.01) |
| *H04M 1/725* | (2021.01) |

(52) U.S. Cl.
CPC ................ *B62B 9/22* (2013.01); *A47D 13/10* (2013.01); *A47D 15/00* (2013.01); *G01D 21/02* (2013.01); *G01P 13/00* (2013.01); *H04M 1/725* (2013.01); *H04W 4/80* (2018.02)

(58) Field of Classification Search
CPC .......... B62B 9/22; G01D 21/02; A47D 13/10; G01P 13/00; H04W 4/80; F16H 21/18; B60N 2/2845
See application file for complete search history.

(56) References Cited

U.S. PATENT DOCUMENTS

| | | | |
|---|---|---|---|
| 2,552,223 A | 5/1951 | Seifts | |
| 2008/0314665 A1* | 12/2008 | Sanders | ................... B62B 9/22 180/166 |

(Continued)

FOREIGN PATENT DOCUMENTS

| | | |
|---|---|---|
| DE | 202005017014 U1 | 1/2006 |
| DE | 102005004501 A1 | 8/2006 |
| EP | 0415736 A1 | 3/1991 |

(Continued)

*Primary Examiner* — Vernal U Brown
(74) *Attorney, Agent, or Firm* — Meunier Carlin & Curfman LLC

(57) ABSTRACT

A stroller rocking device including at least one motorized element (10) provided with a top plate (20) that moves in a to-and-fro movement relative to a stationary plate (30) positioned on the ground, the outer face of the top plate (20) being suitable for receiving a wheel of the stroller. The device is capable of automatically starting the to-and-fro movement by a deliberate gesture by the user consisting in pushing the stroller in such a way as to drive the top plate (20) of the motorized element (10).

20 Claims, 3 Drawing Sheets

(56) References Cited

U.S. PATENT DOCUMENTS

2015/0197271 A1* 7/2015 Vashdi ...................... B62B 9/22
                                                                 180/166
2017/0015343 A1* 1/2017 Diez Fernandez ....... B62B 9/22

FOREIGN PATENT DOCUMENTS

| EP | 2418140 A1    | 2/2012 |
|----|---------------|--------|
| FR | 2651980 A1    | 3/1991 |
| GB | 2432307 A     | 5/2007 |
| WO | 2014013482 A1 | 1/2014 |

* cited by examiner

PORTABLE STROLLER ROCKING DEVICE

TECHNICAL FIELD OF THE INVENTION

The present invention relates to devices intended to rock and oscillate strollers of infant children to accompany them to sleep and relates in particular to a portable and intelligent stroller rocking device to lull them to sleep.

BACKGROUND ART

There are a number of devices for automatically rocking and oscillating baby strollers. These devices consist in inducing a to-and-fro movement of the stroller so as to accompany the child to sleep. These devices step in for the parents during the soothing and falling asleep stage of their child. Indeed, for the parents' convenience, a stroller is often used as a child's second crib as infants need a lot of sleep during the first months of life. When the parents and the child are out of the house, the child may end up in an environment that is not conducive to falling asleep, and the simple act of moving the stroller can have a soothing effect. In some cases such as in a restaurant, at a friend's house or even in a public place, the to-and-fro movement of the stroller given by the parent to rock the child and help him/her fall asleep can be tedious. In particular, in these cases, the use of a device to automatically rock the stroller can be very useful. However, these devices have drawbacks.

A first type of rocking device, described for example in documents FR2651980 and WO2014/013482, comprises a roller or a friction wheel intended to drive one of the wheels of the stroller. The disadvantage of this type of device is that it must be attached to the stroller to be functional and therefore adapted to each type of stroller.

A second type of rocking device is in the form of a platform on which one or more wheels of the stroller are placed. Documents EP2418140 and EP0415736 describe such devices. But due to their large size, they are not intended for mobile use, especially outside the home.

Document DE102005004501 describes a device making it possible to cause an oscillating and rocking movement of a child's crib or stroller.

Finally, document GB 2 432 307 describes a tilting device for a stroller comprising two units, each including a base in contact with the ground and a platform. One of the units is powered and has a motor designed to drive the platform relative to its base. A stroller wheel is placed on the drive unit and a second wheel is placed on the second so-called slave unit.

Another drawback of these systems lies in the risk of conditioning the child's sleepiness to a particular continuous to-and-fro movement produced by these devices. Indeed, these devices operate for a certain time before stopping according to preset or user-defined cycles and according to a given frequency but do not take into account other parameters specific to the child and related to the environment, which can avoid conditioning.

In addition, switching these devices on and off is not practical when the switch is located on the device under the stroller. This lack of user-friendliness can result in misuse by parents who would tend to allow the device to operate longer than necessary.

SUMMARY OF THE INVENTION

This is why the object of the invention is to provide a stroller rocking device which accompanies the child in the stage which precedes falling asleep, which overcomes the aforementioned drawbacks and for which the starting and stopping have been made easier.

The object of the invention is thus a stroller rocking device comprising at least one motorised element provided with a top plate that moves in a to-and-fro movement relative to a stationary plate positioned on the ground, the outer face of the top plate being suitable for receiving a wheel of the stroller. According to one of the main features of the invention, the device comprises a means for automatically starting the to-and-fro movement with a deliberate gesture by the user consisting in pushing the stroller in such a way as to drive the top plate of the motorised element.

BRIEF DESCRIPTION OF THE DRAWINGS

The purposes, objects and characteristics of the invention will become more apparent from the following description when taken in conjunction with the accompanying drawings in which.

DETAILED DESCRIPTION OF THE INVENTION

Mechanical Aspects of the Device

Figure 1:
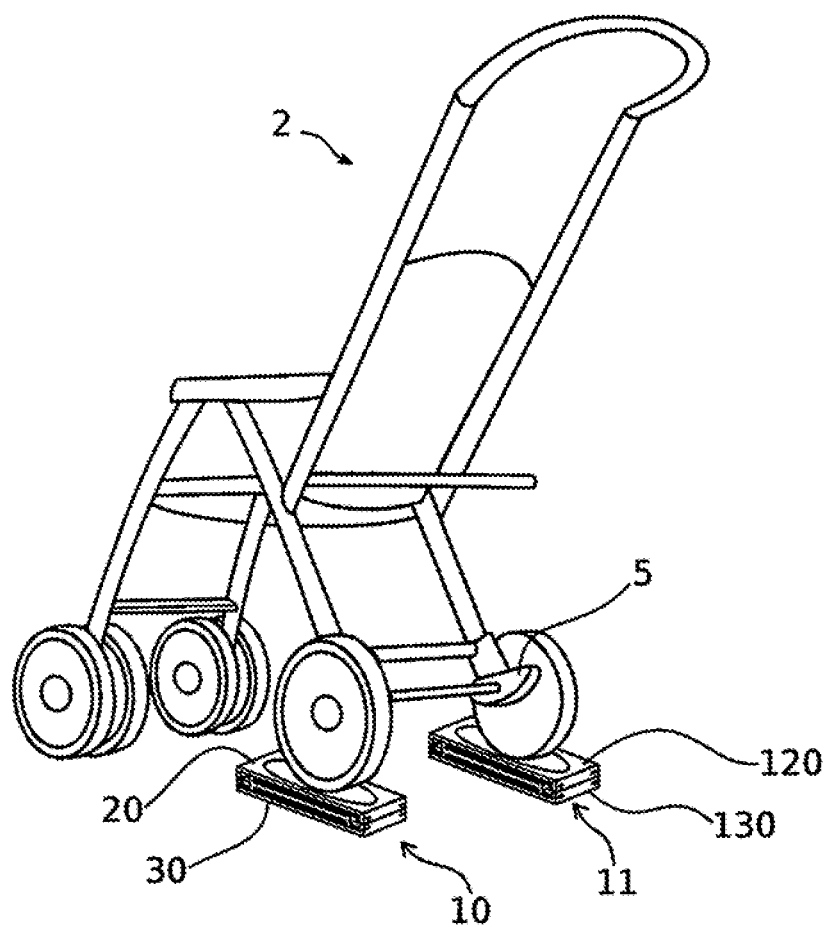
FIG. 1 represents an overall diagram of the device according to the invention and of a stroller.

The device according to the invention includes at least one main element 10 equipped with a motor. According to the preferred embodiment of the invention, the device includes a secondary element 11. Preferably, the secondary element is not motorised. The two elements are each intended to receive a rear wheel of a stroller 2 as can be seen in FIG. 1. The main element is also called a motorised element. Each element 10 and 11, respectively, has a stationary plate 30, 130 placed on the ground and at least one movable plate 20, 120 whose external face is adapted to receive and bear a rear wheel of the stroller 2, the brake 5 of the stroller being applied to prevent the rear wheels from rotating.

Figure 2:
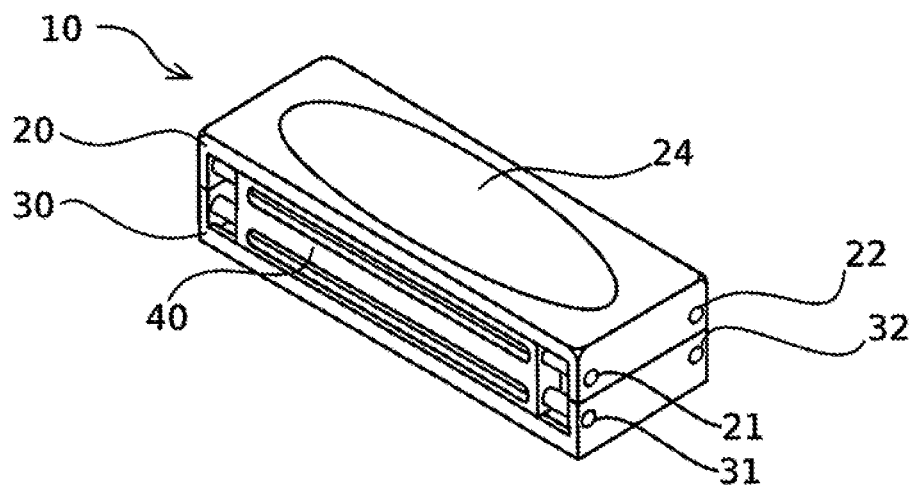
FIG. 2 represents the device according to the invention in three dimensions.

Referring to FIG. 2, the motorised element 10 includes a stationary plate 30 placed on the ground, an intermediate plate 40 movable relative to the stationary plate and a top plate 20 itself movable relative to the intermediate plate. The top plate 20 includes means for preventing the wheel from coming out of the plate unintentionally, such as a non-slip coating 24 or a bowl shape. The top plate 120 of the secondary element 11 includes identical means.

The motorised element 10 includes a motor and means for setting the intermediate plate in motion relative to the stationary plate along a rectilinear trajectory and in a to-and-fro movement, and for setting the top plate in motion relative to the intermediate plate along a rectilinear trajectory and in a to-and-fro movement. The two rectilinear to-and-fro movements are produced along the same axis. The stationary plate and top plate include guide means such as bars 21, 22, 31, and 32 along which the intermediate plate slides.

Figure 3:
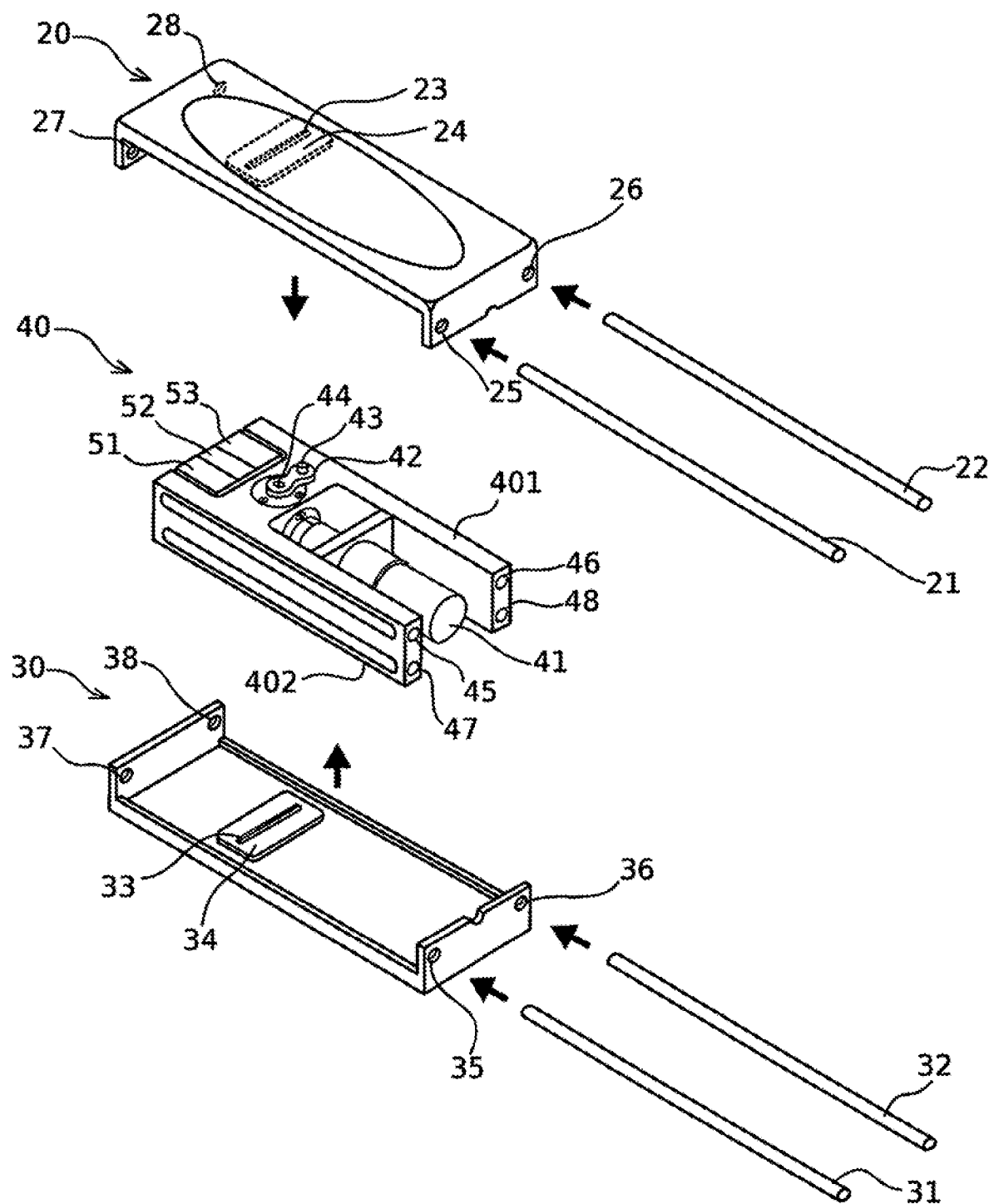
FIG. 3 represents an exploded view of the device according to the invention.

With reference to FIG. 3, the intermediate plate 40 of the motorised element 10 includes an upper face 401 on which the top plate 20 is positioned and a lower face 402, not visible in the figure, on which the stationary plate 30 is positioned. The motorised element 10 includes a motor 41 secured to the intermediate plate 40. The motor 41 drives a shaft 44 by means of a gear, not shown in the figure, comprising bevel gears for the angle gear drive, on which a crank 42 is secured. The crank 42 is therefore rotated about the shaft 44 on which it is secured by one of its ends, while the other free end of the crank includes a part 43, referred to as the crankpin. The motor 41 also drives in rotation a second shaft and a second crank having a crankpin on its free end, these items not being shown in the figure as they are located on the non-visible face 402 of the intermediate plate. The two cranks of identical shape rotate in planes which are parallel to each other and parallel to the ground on which the stationary plate 30 is placed.

The top plate 20 has a groove 23 located on a part 24 secured on the inner face of the top plate, that is to say the one facing the upper face 401 of the intermediate plate. Similarly, the stationary plate 30 includes a part 34 provided with a groove 33, the part 34 being secured on the inner face of the stationary plate 20, that is to say the face opposite the face 402 of the intermediate plate. When assembling the top plate 20 and the intermediate plate 40, the crankpin 43 is placed in the groove 23. Similarly, when assembling the stationary plate and the intermediate plate, the crankpin of the second crank is placed in the groove 33. When the motorised element 10 is completely assembled, the bars 21 and 22 are inserted into the cylindrical cavities 45 and 46 of the intermediate plate 40 and secured to holes 25, 27 and 26, 28, respectively, of the top plate 20. Similarly, the bars 31 and 32 are inserted into the cylindrical cavities 47 and 48 of the intermediate plate 40 and secured to holes 35, 37 and 36, 38, respectively, of the stationary plate 30.

Starting the motor rotates the shaft 44 of the crank 42, which in turn drives, via its crankpin 43 sliding in the groove 23, the top plate 20 in a to-and-fro movement relative to the intermediate plate. Similarly, the motor also rotates the shaft of the second crank which in turn drives, via its crankpin sliding in the groove 33, the intermediate plate 40 in a to-and-fro movement relative to the stationary plate. During these to-and-fro movements, the intermediate plate slides along the bars 21, 22, 31, and 32. The cranks are positioned on their axes so that the arms of the two cranks are not aligned but form an angle between 90° and 180°, and preferably equal to 150°. This angle allows the movements of the two plates to be slightly offset so that, when the intermediate plate changes direction, the top plate, lagging behind the intermediate plate, has not yet changed direction so that its speed relative to the ground decreases when changing direction.

This dual movement configuration has several advantages. Indeed, the wheel of the stroller placed on the motorised element of the device according to the invention is driven by the top plate, the movement of which is softened by a speed which decreases during changes of direction, which allows the stroller not to be shaken excessively.

On the other hand, thanks to the movements of two plates, the total amplitude of the movement is greater than that which would be obtained with a single mobile plate. This allows significant amplitude to be achieved while reducing the size of the device.

In addition, energy consumption is minimised as the motor is always running in the same direction and at a constant speed.

Advantageously, the cyclic to-and-fro movement of the plates is started automatically when the user manually initiates the first movement. This essential function is defined in greater detail in the following description. The secondary element 11 does not include a motor but includes a stationary plate and at least one plate, which is mobile relative to the stationary plate. Preferably, the secondary element includes three plates similar to those of the motorised element, an intermediate plate free to move in translation in a to-and-fro movement relative to the stationary plate placed on the ground, and a top plate free to move in translation in a to-and-fro movement relative to the intermediate plate, the two movements taking place along the same axis. The total amplitude of movement of the top plate is preferably equal to that obtained with the motorised element 10.

The surfaces in contact with the ground of the two elements 10 and 11 are each provided with a non-slip pad and a magnetized part intended to cooperate and keep the two elements bonded to each other. According to a different embodiment, one of the two elements is stored inside a cavity arranged in the other element.

Electrical Aspects of the Device

Figure 4:
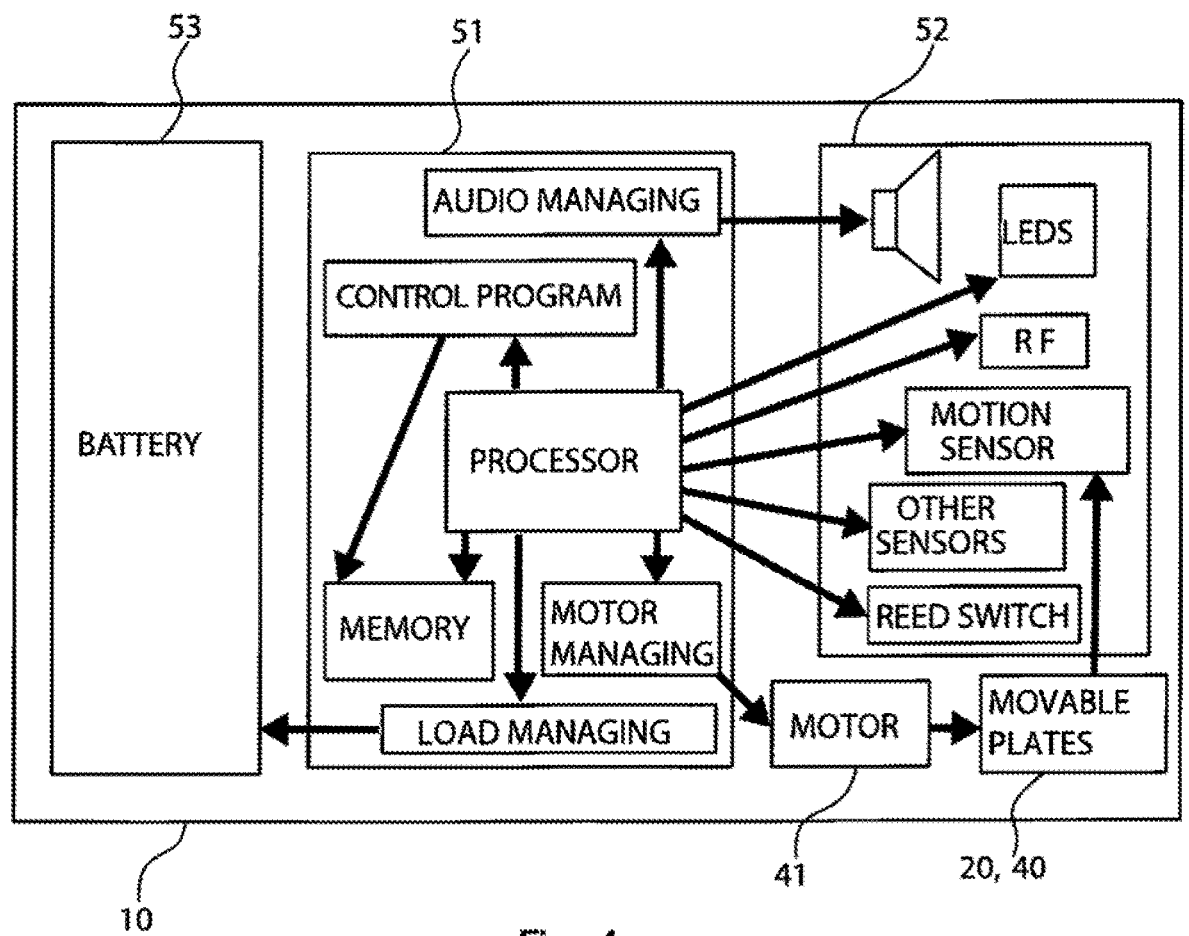
FIG. 4 represents a block diagram of the electrical circuit of the device according to the invention.

With reference to FIG. 4, the motorised element also includes a control and piloting module 51, a peripheral module 52 and a charging module such as a battery 53. The control and piloting module comprises an electronic board provided with a processor, a control program, a memory and means for managing the peripherals. The peripheral module 52 comprises a radiofrequency signal (RF) transceiver circuit, therefore capable of exchanging data remotely with a contactless device, and a motion sensor capable of providing the processor with information relating to the restlessness of the child. The peripheral module includes other sensors such as a pressure sensor and means for measuring the noise level, the temperature and the ambient humidity, an audio device, LEDs, and means for putting the motorised element on standby, such as a reed switch. The pressure sensor allows the device to detect when the child is in the stroller.

The reed switch changes state when the two elements 10 and 11 are in contact, for example, when their magnetic parts cooperate with each other. Standby may mean that the motor is off and that the plates are locked, but may allow the RF transceiver module to operate. The battery 53 of the motorised element is rechargeable by means of a wireless electric charger or by using an adapter to be connected to the mains. A second battery, which acts as a backup battery, can be contained in the secondary element. The second battery charges the first battery when the two elements are in contact. The motorised element has a charge indicator to inform the user of the charging status of the battery. This indicator can be a coloured LED. A LED can also indicate the status of the device, such as "operating", "on standby" and "exchanging data with the digital terminal" depending on the colour.

Digital Terminal

Figure 5:
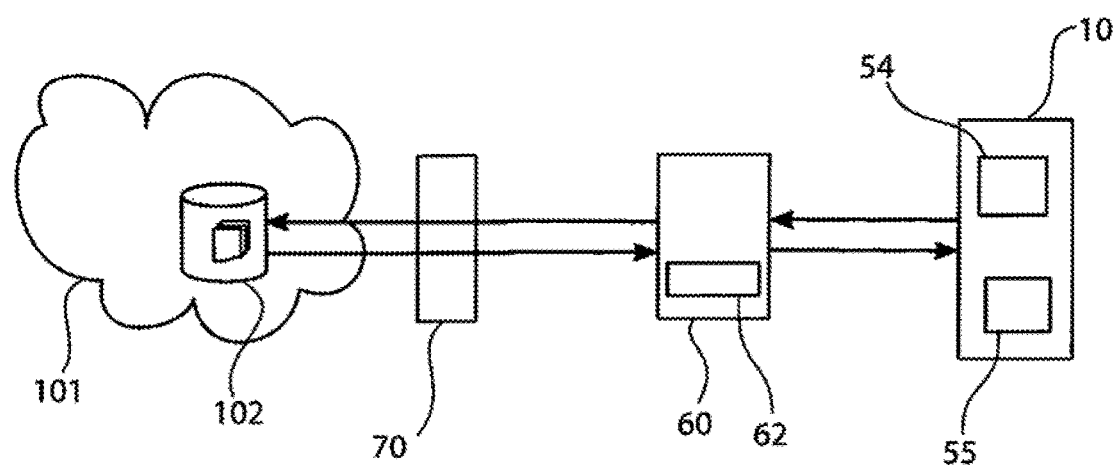
FIG. 5 represents the general operating diagram of the device according to the invention as a connected object.

The contactless RF transceiver circuit of the motorised device 11 is preferably based on a Bluetooth-type communication protocol. With reference to FIG. 5, the Bluetooth module 54 of the motorised element 10 is capable of exchanging data with a smartphone-type digital terminal 60. This exchange of information can be done in both directions. The mobile digital terminal 60 can be a smartphone, a tablet, or a computer and includes a touch screen. The digital terminal is wirelessly connectable to a database 102 accessible on the Internet network 101 via a telecommunication and geolocation network or the like. An interface or an application 62 installed on the digital terminal allows the user to control the status of the device and the data recorded during its use. The data of each device can be stored in the database 102 accessible by an identification means 70 of the user. On the interface 62, the user also finds all of his/her data, programs, settings, etc. The usage data can be viewed, for example, in the form of a graph showing usage as a function of time.

Control Program

The control program 55 stored in the memory of the motorised element can only be run when the motorised element is not on standby. The control program is, therefore, run in the absence of communication with the digital terminal. Mainly, the control program controls the starting and stopping of the motor, the duration of the operating ranges and their frequency according to a default preset sequence recorded in the memory of the motorised element. The default sequence consists in starting the motor, running it for a period between 2 minutes and 4 minutes, for example equal to 3 minutes, stopping the motor and switching the device to "Listening", that is to say ready to restart if the child cries or the stroller moves. The default control program can be updated via the digital terminal 60, but it can also evolve autonomously as it is used, in the manner of an expert system.

The control program can be adapted by means of information it received from the motorised element and recorded during operation of the latter. The information can be that measured by sensors and measuring means of environmental parameters such as noise, restlessness of the child, temperature, humidity, etc. Adapting the control program means defining or modifying certain variables of its operation from the parameters recorded by the sensors as the device is used, and defining an adapted sequence.

Through the interface 62 of his/her digital terminal, the user can choose whether, when the device is started, the control program will execute the default sequence or the adapted sequence. Of course, through the interface 62 of the digital terminal 60, the user himself/herself can vary certain parameters of the control program such as the duration of the operating ranges and their frequency within the limit of the maximum range defined in advance for the safety of the child and avoid conditioning of the latter.

Collaborative Platform

The database 102 accessible on the Internet is fed by the owners and users of the device according to the invention who use the application on their digital terminal. The data collected is used anonymously. The data can then be used to establish statistics and develop a collaborative platform.

The database can also be used to develop a new version of the control program and make it available online to users. Indeed, from the data collected, correlations can be established between environmental variables and the need to rock a child. Therefore, the user's control program can also be adapted from data available on the collaborative platform. This ability to connect to an information network gives the device according to the invention the status of a connected object.

The following description describes the operation of the device according to the invention.

When parents need to rock their child placed in a stroller, they separate the two elements 10 and 11 from each other and place them on the floor. The stationary plate 30 of the motorised element and the stationary plate 130 of the secondary element being located on the ground, the wheels of the stroller on which the stroller brake 5 is applied are each placed on one of the elements.

The device is started by a deliberate gesture by the user consisting in pushing the stroller so as to drive the top plate 20 of the motorised element 10. The motion sensor then sends a message to the processor, which starts the motor and runs the control program. The to-and-fro movement of the plates causes the stroller to rock slightly. The rocking movement is stopped automatically after a relatively short preset period of between 2 and 4 minutes. The stop is progressive, that is to say that the speed of the to-and-fro movement gradually decreases before the movement stops. When the motor stops, the plates are aligned with each other so that the motorised element 10 forms a parallelepiped as shown in FIG. 2. The device then detects any movement of the stroller or crying, which would mean that the child is still restless and the rocking would then be resumed automatically. The device can be restarted, and the rocking resumed at any time with a deliberate gesture by the user. The device can thus be started several times, consecutively for short periods until the child has calmed down.

The device can also be stopped deliberately by the user. For this, the user holds the stroller, a signal is sent by the motion sensor to the processor, and the control and piloting module sends a stop signal to the motor. The device is also stopped when the user removes the stroller from the device, or when the child is removed from the stroller which rests on the device. In these two cases, the pressure sensor detects a change in weight, and the control and piloting module sends a stop signal to the motor.

Each time the device is used, data such as the number of consecutive times the device has started, time, ambient noise level, humidity, temperature, is recorded. The data is stored in the memory of the motorised element before there are sent to the digital terminal 60.

No communication between the digital terminal 60 and the motorised element 10 is possible and authorised when the device is placed under the wheels of the stroller and operating. Indeed, as soon as the two elements are separated from each other, the Bluetooth module 54 is switched off, whereas, when the two elements are associated with each other by magnetic contact or by insertion of one inside the other, communication is again possible. This interruption in wireless communication, activated by the reed switch, allows the device not to emit radio waves when it is used, therefore when it is near the child.

From the first stored data, the control program can be adapted according to the content of the data as described previously.

For example, if the number of consecutive times when the device sets in motion is greater than 4, (the child has not calmed down despite the consecutive rocking periods), the control program is modified so that the duration of the first rocking cycle will be increased the next time the device is used. The control program can be adapted using other data such as the time of day, ambient temperature, etc. In addition, even if the control program is adapted, it is always adjusted to avoid conditioning the child. For example, two consecutive operating sequences, each corresponding to the child's falling asleep, will not be identical.

The motorised element is provided with a loudspeaker so as to play sounds such as lullabies or nature noises. These sounds, previously recorded in the memory of the motorised element, can be selected and recorded by the user himself/ herself via the interface 62 of the digital terminal 60.

Thanks to the pressure sensor of the motorised element 10, the device can also indicate when the child is removed from the stroller by means of a light signal or audible signal.

The invention claimed is:

1. A stroller rocking device (2) comprising at least one motorised element (10) provided with a top plate (20) that moves in a to-and-fro movement relative to a stationary plate (30) positioned on the ground, the outer face of said top plate (20) being suitable for receiving a wheel of the stroller,
    wherein the device includes a means for automatically starting the to-and-fro movement with a deliberate gesture by the user consisting in pushing the stroller (2) in such a way as to drive said top plate (20) of the motorised element (10).

2. The device according to claim 1, wherein said motorised element (10) includes an intermediate plate (40) movable relative relative to said stationary plate (30) and on which slides said top plate (20).

3. The device according to claim 1, wherein the motorized element comprises a motor (41) secured to said intermediate plate (40), said motor drives a shaft (44) on which is secured the end of a crank (42), said shaft rotating said crank in a plane parallel to the ground, said crank in turn driving said upper plate (20) in a to-and-fro translational movement, relative to said intermediate plate (40) by means of a crankpin (43), located at the free end of said crank, which slides in a groove (23) located on the inner face of said top plate (20).

4. The device according to claim 3, wherein satd motor (41) drives a second shaft on which the end of a second crank is secured, said second shaft rotating said second crank in a plane parallel to the ground, said second crank driving in turn said intermediate plate (40) in a to-and-fro translational movement relative to said stationary plate (30) by means of a crankpin, located at the free end of said second crank, which slides in a groove (33) located on the inner face of said stationary plate (30).

5. The device according to claim 3, wherein said top plated (20) and stationary plate (30) include guide means (21, 22, 31, 32) along which said intermediate plate (40) slide.

6. The device according to claim 4, wherein the arms of said two cranks are not aligned but form an angle between 90° and 180°, and preferably equal to 150°.

7. The device according to claim 1, wherein the device includes a non-motorized secondary element (11) comprising a stationary plate (130) and at least one plate (120) which is movable relative to said stationary plate (130).

8. The device according to claim 7, wherein said top plates (20) and (120) include means for preventing the wheel from leaving the plate unintentionally.

9. The device according to claim 7, wherein the surfaces in contact with the ground of said two elements (10 and 11) are provided with a non-slip pad and with a magnetized part intended to cooperate and hold the two elements together (10 and 11) when not in use.

10. The device according to claim 9, including a means for putting said motorized element (10) on standby, said means being a reed switch, the state of which changes when said two elements (10) and (11) cooperate by contact of said magnetized parts.

11. The device according to claim 1, wherein said motorized element (10) comprises a control and piloting module (51), a peripheral module (52) and a charging module such as a battery (53), said three modules being interconnected.

12. The device according to claim 11, wherein said control and piloting module (51) comprises an electronic board provided with a processor, a control program (55), a memory, and means for managing the peripheral module, said control program (55) controlling the starting and stopping the motor, the duration of the operating ranges and their frequency according to a sequence which is preset and recorded in said memory of said motorized element (10).

13. The device according to claim 12, wherein said peripheral module (52) comprises a radio frequency (RF) transceiver circuit such as a Bluetooth module (54), and a motion sensor able to provide the processor with information about the restlessness of the child.

14. The device according to claim 12, wherein said peripheral module (52) comprises a pressure sensor, means for measuring the noise level, ambient temperature and humidity, a loudspeaker, LEDs and a means for putting said motorized element (10) on standby.

15. The device according to claim 13, wherein said Bluetooth module (54) of the motorized element (10) is capable of communicating and exchanging data with a digital terminal (60) of the smartphone type, the exchange of data being authorised and possible only when said two elements (10) and (11) are in contact, that is to say when said device is on standby.

16. The device according to claim 15, wherein said mobile digital terminal (60) is a smartphone, an interface or an application (62) installed an the digital terminal allowing the user to control, after the use of said device, the data recorded during its use.

17. The device according to claim 16, wherein the data of said device is stored in a database (102) accessible by a means of identification (70) of the user on the Internet, said database (102), accessible on the Internet, being fed by the owners and users of the device according to the invention who use the interface (62) on their digital terminal, said database being used anonymously in order to establish statistics and for the development of a collaborative platform.

18. The device according to claim 12, wherein said control program (55) is run automatically after the device has started with a deliberate gesture by the user, according to a default sequence or according to a sequence which is adapted after several uses of the various data recorded by said sensors, said sequences being recorded in the memory of said motorized element.

19. The device according to claim 11, wherein said secondary element (11) contains a backup battery which recharges said battery 53 when said two elements (10) and (11) are in contact.

20. The device according to claim 14, wherein an audible signal or a light signal is emitted when the child is removed from the stroller.

\* \* \* \* \*